United States Patent [19]

Balatinecz

[11] 4,111,730
[45] Sep. 5, 1978

[54] PRODUCING RECYCLE COMPOSITION PAPER FLAKE BOARD

[76] Inventor: John J. Balatinecz, 41 Bloomington Crescent, Downsview, Ontario, Canada

[21] Appl. No.: 722,468

[22] Filed: Sep. 13, 1976

Related U.S. Application Data

[63] Continuation-in-part of Ser. No. 236,741, Mar. 21, 1972, abandoned.

[51] Int. Cl.² ........................... B31D 3/00; B29J 5/06
[52] U.S. Cl. ................................. 156/62.2; 156/63; 156/242; 156/285; 156/306; 156/311; 156/312; 156/335; 428/407; 428/529; 428/531; 428/535; 264/112; 162/165; 162/166; 162/176; 162/189; 162/225; 106/163 R
[58] Field of Search ............... 156/62.2, 63, 242, 285, 156/306, 311, 312, 335; 264/112; 162/165, 166, 176, 189, 225; 106/163; 428/535, 407, 529, 531

[56] References Cited

U.S. PATENT DOCUMENTS

| | | | |
|---|---|---|---|
| 3,459,629 | 8/1969 | Kawam | 264/113 |
| 3,563,844 | 2/1971 | Brown | 156/62.2 |
| 3,718,536 | 2/1973 | Downs | 156/62.2 |
| 3,968,294 | 7/1976 | Robitschek et al. | 156/335 X |
| 4,012,561 | 3/1977 | Doughty et al. | 428/535 |

*Primary Examiner*—P. C. Ives
*Attorney, Agent, or Firm*—Arne I. Fors

[57] ABSTRACT

A method of producing dry-process composition paper board from waste paper. Waste paper is particulated into flakes and the like fragments, conditioned for moisture content, and blended with an adhesive such as a synthetic thermosetting resin prior to forming by compression into mats which are cured under high pressure and temperature to form a rigid, cohesive paper flake board.

The method obviates the need of sorting, pulping, cleaning and purification of waste paper and permits manufacture of structural panel boards in small recycling plants.

8 Claims, 6 Drawing Figures

PRODUCING RECYCLE COMPOSITION PAPER FLAKE BOARD

This application is a continuation-in-part of Application Ser. No. 236,741, filed Mar. 21, 1972, now abandoned.

BACKGROUND OF THE INVENTION

This invention relates to a method for the manufacture of structural composition panel boards and, more particularly, relates to a method of producing composition paper flake boards from recycle waste paper, and to the product produced thereby.

The recycling of waste paper is highly desirable in that waste paper is being generated in ever-increasing quantities, particularly in urban areas. Conventional methods of waste treatment and disposal, such as by landfill and by incineration, are becoming impractical for the increasing quantities of waste paper in that landfill areas are becoming scarce and expensive and incineration, apart from being costly, is a significant contributor to air pollution.

Recycling of waste paper is desirable also in that the natural resources supplying pulp and wood products are being depleted at an increasing rate and, as population and industrial production continues to expand, salvage and re-use of solid waste must be successfully achieved to ease the demands on available natural resources.

Waste paper conventionally is re-used by repulping the waste paper and manufacturing various types of paper therefrom. However, conventional repulping has a number of inherent limitations in that the waste paper often contains additives, such as printing ink, sizing agents, wet strength resins, fillers and the like which adversely affect the products to be produced from the waste paper if these deleterious additives are permitted to remain and which may make the reclamation of the paper fibres prohibitively expensive if removed. In addition, repulping of paper requires the use of copious quantities of process water, the disposal of which augments water pollution problems.

Due to the presence of many different types and grades of waste paper in a mix, homogenity of paper is not permitted and the repulping and re-use of the variety of fibres from such a mix may not be technically and economically feasible. In addition, pulp and paper operations require expensive capital investments, which places severe economic constraints on the recycling of waste paper.

The method of my invention substantially overcomes many of the foregoing problems which limit the recycling and use of waste paper. Repulping of paper is not required and, therefore, process water which creates the possibility of water pollution is not needed in any large quantities. Additives inherently present in the original paper need not be removed and hetergenous paper waste need not be sorted. The method can be practiced economically in small plants and, thus, even small or medium sized municipalities can set up recycling plants with low capital investments for the recovery and re-use of waste paper.

SUMMARY OF THE INVENTION

In general, the method of my invention involves the particulating of mixed or homogenous waste paper into fragments such as small paper flakes, fiber bundles and finely fragmented cellulosic matter, hereinafter referred to as "paper flakes" which are conditioned to have a low moisture content and the paper flakes then blended with a binding adhesive such as a thermosetting resin having the characteristics of, for example, urea- or phenol-formaldehyde, forming the treated paper flakes into a mat, depositing a fine layer of a mixture of wood flour or finely fragmented cellulosic matter and urea-, melamine- or phenol-formaldehyde resin in a ratio of from 1:1 to 4:1 as a layer on surfaces of the said paper flake mat and compressing the said mat by the application of high pressure and temperature for curing the mat into a rigid cohesive structural composition panel.

It is a principal object of the present invention, therefore, to provide a simple method for the economic recycle and re-use of waste paper.

It is another important object of the present invention to provide a method for the recycle and re-use of waste paper which obviates the need for homogenity of paper and which obviates the need for repulping and removal of deleterious additives such as printing ink, sizing agent, resins, fillers, staples and the like.

Another important object of the present invention is the provision of a simple method for the production of a useful building product in the form of structural panel composition boards which have good strength and the like characteristics which render the panel boards suitable for construction and building purposes.

BRIEF DESCRIPTION OF THE DRAWINGS

These and other object of the invention and the manner in which they can be attained will become apparent from the following detailed description of the method of the invention and the products produced thereby, with reference to the accompanying drawings, in which.

DESCRIPTION OF THE PREFERRED EMBODIMENT

Figure 1:
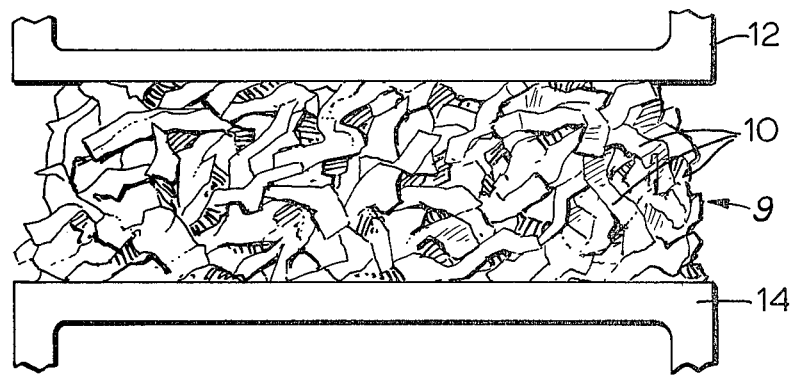
FIG. 1 illustrates a loose paper flake mat prior to compressing into a paper flake board.

In accordance with a preferred embodiment of the method of my invention, waste paper is mixed or homogenous form is formed into fibers or into small fragments of, for example, from about ¼ to about 2 inches in width and from about 1 to about 6 inches in length. It will be understood that paper flakes used in the method of the invention are fragments produced by shredding, tearing or the like particulating of paper.

The paper flakes are conditioned by the addition or removal of water to provide a moisture content of from about 6% to about 12% by weight of total dry paper and then blended with a binding adhesive such as catalysed urea-formaldehyde resin emulsion containing about 50%, ± 10%, resin solids. The urea-formaldehyde resin emulsion is added in an amount to provide from about 6% to about 15% of resin solids based on the total dry weight of paper. A suitable catalyst is ammonium chloride or ammonium sulphate added to the urea-formaldehyde in an amount of about 0.5% by weight of the resin emulsion.

Other thermosetting resins such as phenol-formaldehyde may be blended with the paper flakes as an alternative binding adhesive to the urea-formaldehyde adhesive. The phenolic resin for example, added as an emulsion, preferably contains about 45%, ± 5%, resin solids. The phenolic resin emulsion is added to the paper in an amount to provide from about 2% to about 6% of resin solids based on the total dry weight of paper.

The paper flakes also may be sprayed with a wax emulsion if desired to provide moisture repellency in the finished product. The amount of wax to be incorporated into the board may be from about 0.5% to about 2%, based on the total dry weight of the paper. Other additives, such as fire retarding agents including mono- and di-ammonium phosphate in an amount of about 15% by weight of dry paper, and preservatives, may be blended with the paper flakes if the properties which these materials represent are desirable in the finished product.

It is important that during the blending of additives with the paper flakes that care be exercised that the moisture content of the flakes does not exceed about 12%. The adjustment and maintenance of a moisture content below this level, preferably within the range of from about 6% to about 12%, is necessary for the prevention of problems such a steam generation during and immediately after hot pressing.

The blending of additives with the paper flakes can be accomplished in a horizontal drum-type blender. The flakes are intermittently suspended in air by paddle arms while the additives are sprayed onto the suspended flakes from atomizing sprayer heads. The paper flakes having the appropriate additives sprayed thereon are discharged into a surge or storage bin prior to processing into a paper flake board.

To improve surface quality of the resulting panels and to enhance strength and stiffness, a blended mixture of wood flour or finely fragmented cellulosic matter and urea-, melamine- or phenol-formaldehyde resin in a ratio of from 1:1 to about 4:1 is deposited as a fine layer of about 1 to 5 thousandths of an inch on the surfaces of the mat.

In accordance with one embodiment of the method of my invention, the paper flakes prepared as discussed above are fed into a deckel box which provides a uniform layer of paper in the form of a mat which is deposited onto a caul plate.

Figure 2:
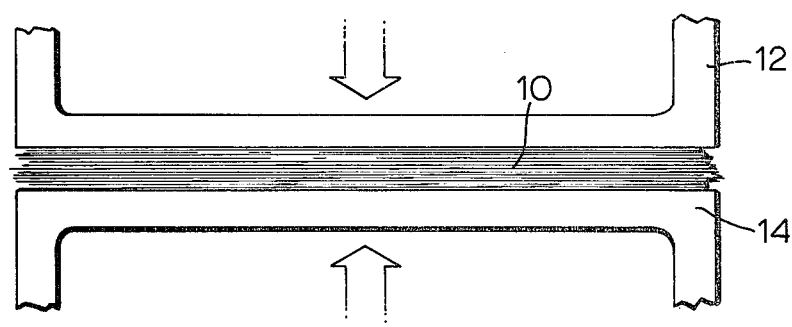
FIG. 2 is an elevation of the paper flake board produced by compressing paper flakes at elevated temperature and pressure.
Figure 3:
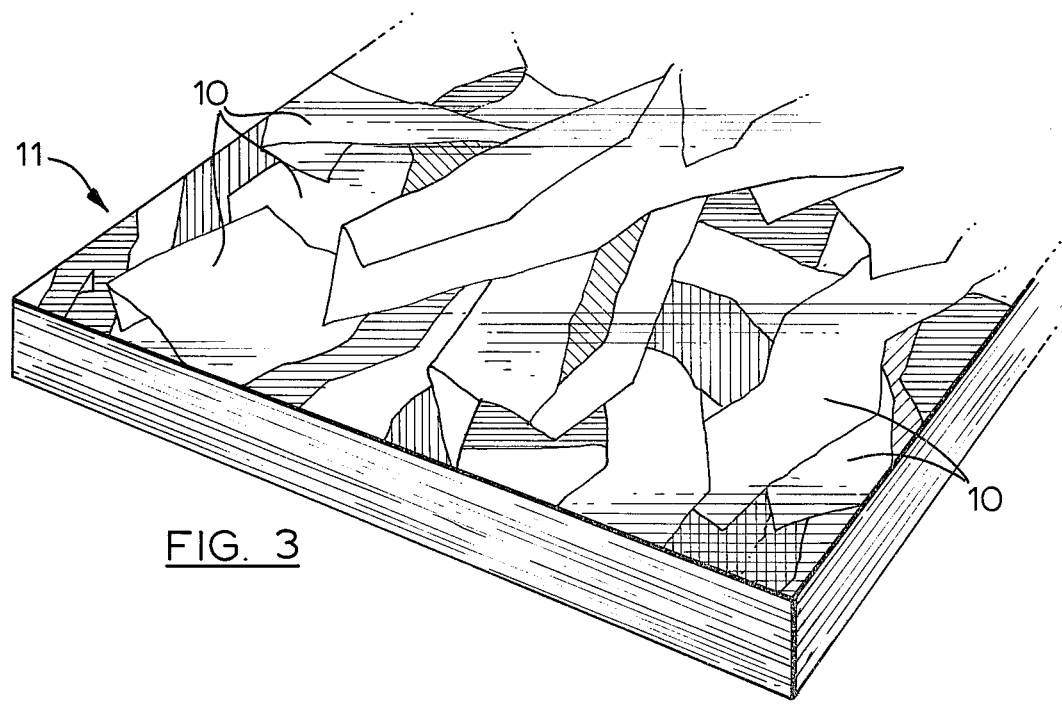
FIG. 3 is a perspective view of the paper flake board removed from the press with the surface layer not shown.

Prior to feeding of the paper flake-resin mixture onto the caul plate, the fine layer of the blended mixture of the wood flour or cellulosic matter and resin is formed by spraying or rolling a wet slurry or blowing a dry mixture onto the caul. The loose paper flake mat 9, shown in FIG. 1, is built up on the caul to a sufficient and uniform thickness by an accumulation of flakes 10 to provide a finished compressed board 11, shown in FIGS. 2 and 3, having the desired density. For example, the loose mat thickness may range from about 2 inches to about 24 inches to provide a compressed board ranging in size from about ¼ inch to about 1½ inches, representing a compression ratio of from about 8:1 to about 16:1.

A fine layer of the blended mixture of the wood flour or cellulosic matter and resin is applied to the upper surface of the mat and the mat preferably is first pre-pressed in a mold press at ambient temperature at a pressure in the range of from about 150 p.s.i. to about 600 p.s.i. After pressing at ambient temperature, the paper flake mat is hot pressed in a hydraulic press, the platens 12, 14 of which are heated, at a pressure within the range of from about 150 p.s.i. to about 1000 p.s.i. at a temperature in the range of from about 200° F. to about 450° F. The paper flake mat is subjected to this hot press from about 5 to about 20 minutes, and, after hot pressing, the board is cooled, conditioned for humidification, and trimmed to a desired size.

Press stops are employed to regulate the closing of the press platens to a desired final thickness of board. Finished board thickness may range from about ¼ inch to about 1½ inches, and board density may range from about 19 pounds per cubic foot to about 75 pounds per cubic foot.

After trimming, the board may be overlayed with a decorative plastic laminate and wood veneer, or the board may be painted or finished with a clear plastic, as desired.

In accordance with another embodiment of my invention, the resin-coated paper flakes prepared as discussed above can be fed from the storage bin into a heated vertical or horizontal extrusion press and extruded through a front press opening by a hydraulic ram. A temperature range of from about 200° F. to about 450° F. and a pressure range of from about 150 p.s.i. to about 600 p.s.i. were found satisfactory to produce a good quality paper flake board as a continuous panel which can be subsequently trimmed and cut to desired dimensions.

The thickness and density of extruded composition flake board will vary within a narrower range than the similar properties of flat-pressed board. For example, extruded composition flake board may have a thickness of from about ½ inch to about 2 inches and the density may vary from about 30 to about 60 pounds per cubic foot.

It will be understood that powdered urea-, melamine-, or phenolic-formaldehyde resin binding adhesives can be blended with paper flakes and the resulting material, after appropriate conditioning for a moisture content of from about 10 to 12 percent moisture, platen pressed or extrusion pressed at elevated temperature for the production of a thermoset composition paper flake board. The higher level of moisture content is necessary to ensure the proper distribution and adherence of the resin particles to the paper flakes.

The method of the present invention will now be described with reference to the following example, it being understood that the examples set forth are illustrative only of the methods of the invention and the products produced thereby and are not to be construed as limiting thereto.

EXAMPLE 1

A number of test panels 13 × 13 inches × 7/16 inch were formed from newspaper shredded into ¼ to ½ inch strips 4 to 8 inches in length. An emulsion of catalysed urea-formaldehyde resin in water having a resin solids content of about 60% by weight of the emulsion, pH of about 7.5 and a viscosity of about 200 c.p.s., were sprayed evenly onto the shredded paper to provide a resin content of 10% based on dry weight of the paper. The resin was catalysed by the mixing of a 1% solution of ammonium sulphate with the resin emulsion to provide a catalyst concentration of 0.5% by weight of the resin.

A wax emulsified with water was applied in the amount of 1% by weight wax, based on dry weight of paper, to the shredded paper.

A uniform thickness of the threaded shredded paper was formed in a deckel box and compressed at ambient temperature onto a caul plate to form a mat which was hot pressed at a temperature of about 350° F. at a pressure of about 400 p.s.i. for 15 minutes.

Panel densities of 0.4, 0.5 amd 0.6 g/cc were obtained by progressively increasing the volume of shredded newspaper used for the panels.

It was found that the low density panels had a porous surface and, as the panel density was increased, surface texture improved by decrease in porosity. The panels could be readily painted with an alkyd enamel paint with little absorption of paint by the board. Wood veneers and decorative plastic laminates could be bonded to the surfaces of the panels by the use of the urea-formldehyde adhesive described above to provide a hard and aesthetic panel surface.

Table 1 illustrates representative results of static bending tests on panel samples 2 × 8 inches in size in accordance with ASTM Designation C 1037-64 (Part 16), for Standard methods of Evaluating the Properties of Wood-Base Fibre and Particle Board Materials, in which S.G. is specific gravity, M.C. is moisture content, M.O.R. is modulus of rupture, and E is modulus of elasticity.

TABLE I

| Specimen No. | S.G. | M.C. % | M.O.R. p.s.i. | E p.s.i. |
|---|---|---|---|---|
| 1. | 0.43 | 12.0 | 670 | 74,600 |
| 2. | 0.49 | 12.0 | 703 | 89,000 |
| 3. | 0.57 | 12.0 | 727 | 95,230 |

Figure 4:
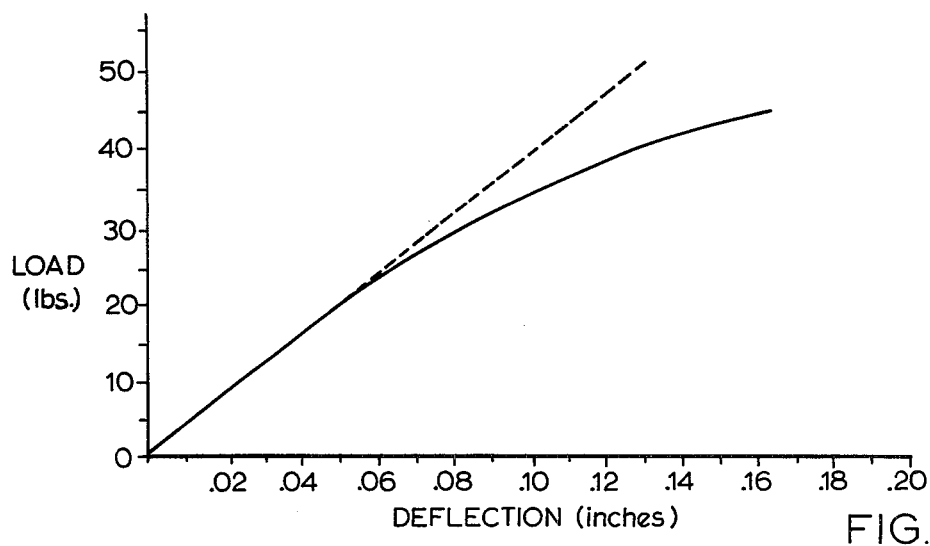
FIG. 4, 5 and 6 illustrate deflection curves for paper flake boards of the invention.

It will be evident from the above tests that the M.O.R. and E increased with increasing density of the panels. FIG. 4 shows a representative deflection curve for an 8 × 2 inch panel produced according to this example.

EXAMPLE II

Test panels 13 × 13 × ½inches were produced from wet strength, coated paper shredded to a width of ¼ inch and cut to a length of 3 - 4 inches. A 0.8 g/cc density was obtained for all panels with resin contents of catalysed urea-formaldehyde of 10%, 12.5%, and 15% based on dry weight of paper. Other than panel density, resin content and nature of waste paper, method parameters were the same as those of Example 1 described hereinabove.

Table 2 illustrates average results of 12 static bending tests, conducted in the manner described with reference to Example I, for each of the resin contents.

TABLE 2

| Resin Content % | S.G. | M.C. % | M.O.R. p.s.i. | E p.s.i. |
|---|---|---|---|---|
| 10% | 0.77 | 12.0 | 1950 | 320,000 |
| 12.5% | 0.74 | 12.0 | 2100 | 325,000 |
| 15% | 0.78 | 12.0 | 2525 | 382,000 |

Figure 5:
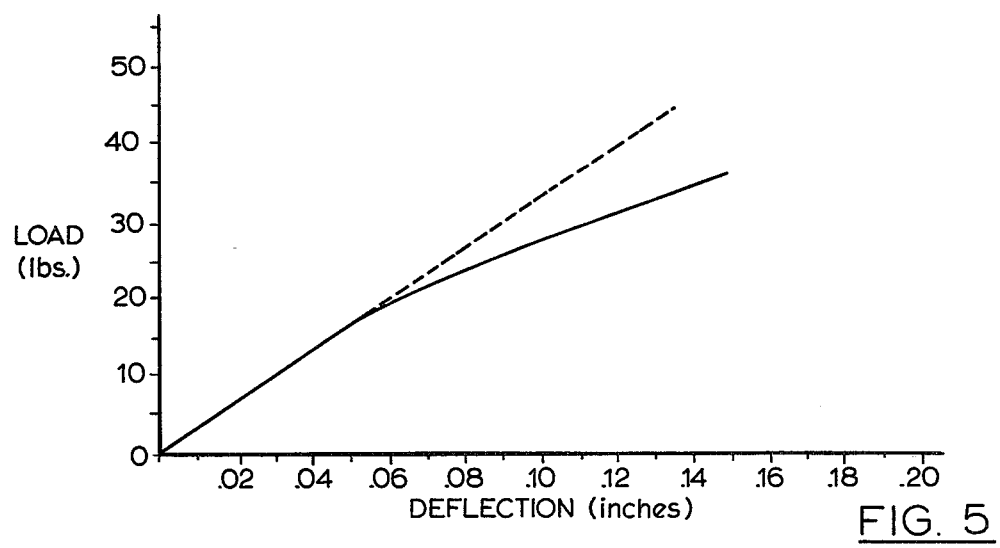

An adhesive resin content of about 10 - 12% based on dry weight of paper provided satisfactory binding of the shredded paper with adequate strength properties for commercial use. FIG. 5 shows a representative deflection curve for an 8 × 2 inch panel produced according to this example.

EXAMPLE III

The tests of Example II were repeated with wet strength, coated paper of a stronger paper type than that of the paper of Example II shredded to a width of ¼ inch and cut to 12 - 14 inches in length.

Table 3 illustrates average results for 12 static bending tests conducted in the manner described above.

TABLE 3

| Resin Content % | S.G. | M.C. % | M.O.R. p.s.i. | E p.s.i. |
|---|---|---|---|---|
| 15 | 0.80 | 9.5 | 3800 | 420,000 |

Figure 6:
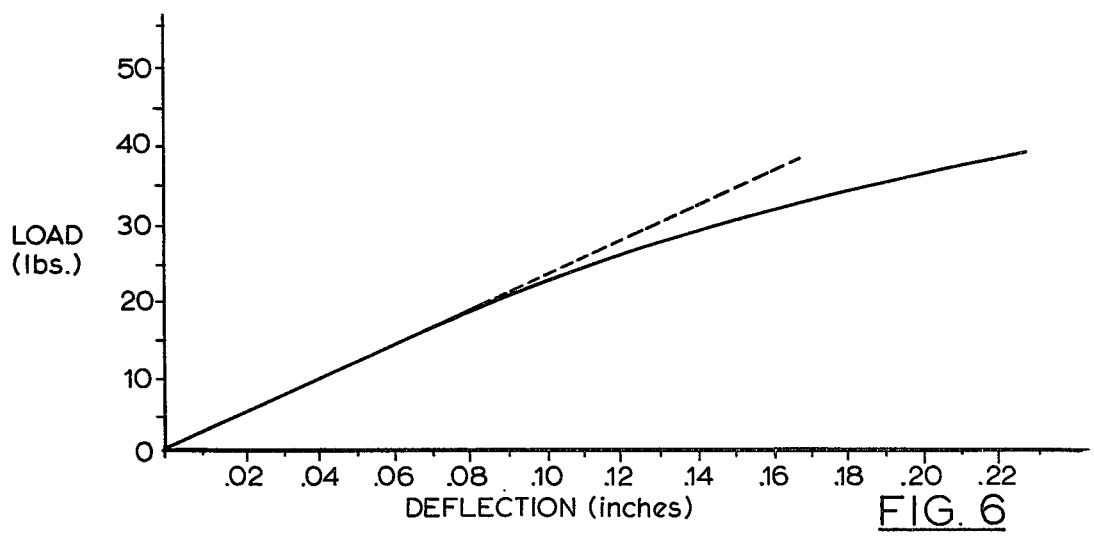

The foregoing table indicates an increase in average panel density, decrease in moisture content, and substantial increases in modulus of rupture and modulus of elasticity. FIG. 6 shows a representative deflection curve for an 8 × 2 inch panel produced according to this example.

EXAMPLE IV

Test panels 13 × 13 inches × 7/16 inch having a density of 0.7 g/cc were produced from shredded newspaper. A 12% resin content, by weight of dry paper, of urea-formaldehyde was used in all panels and, apart from variation of wax content, method parameters were the same as those of Example 1 described hereinabove. Wax contents tested were 1%, 2% and 3% based on dry weight of paper.

Table 4 illustrates the effects of 2 and 24 hour water immersion tests on 3 × 5 inch panel samples

TABLE 4

| Wax Content % | M.C. % | | | Thickness Swelling % | | Water Absorption % by weight | |
|---|---|---|---|---|---|---|---|
| | initial | 2 hr. | 24 hr. | 2 hr. | 24 hr. | 2 hr. | 24 hr. |
| | 9.5 | 214.4 | 228.4 | 42.4 | 45.4 | 187.0 | 199.8 |
| 1 | 8.9 | 160.5 | 175.1 | 48.0 | 51.5 | 139.3 | 152.8 |
| | 9.8 | 114.0 | — | 29.6 | 33.5 | 112.5 | 130.5 |
| | 9.3 | 134.0 | 151.9 | 28.8 | 32.1 | 94.9 | 108.3 |
| | 10.0 | 19.8 | 27.7 | 1.9 | 4.5 | 6.1 | 13.0 |
| | 10.4 | 18.5 | 25.5 | 2.5 | 4.3 | 4.5 | 10.7 |
| 2 | 9.7 | 17.9 | 25.2 | 5.3 | 9.2 | 4.6 | 11.1 |
| | 11.6 | 20.9 | 27.2 | 3.0 | 3.7 | 5.5 | 11.0 |
| | 11.4 | 21.6 | 28.7 | 1.7 | 6.3 | 6.3 | 12.5 |
| | 8.4 | 17.4 | 23.3 | 1.2 | 4.7 | 5.3 | 10.8 |
| 3 | 10.3 | 18.1 | 26.0 | 1.2 | 3.5 | 4.3 | 11.2 |
| | 12.9 | 19.6 | 25.0 | 0.4 | 2 | 3.2 | 7.8 |

An increase in wax content from 1% to 2% substantially decreased water absorption, particularly for absorption for 2 hours.

EXAMPLE V

The preferred paper flake boards of the invention having a fine layer of blended mixture of wood flour and powdered melamine-formaldehyde resin in the ratio of 3:1 with a thickness of about four-thousandths of an inch were produced on mats having the composition described in Example II. These panels were produced in a one-step pressing operation.

The resulting panels had a smooth surface texture suitable for painting, printing or overlaying without the need for sanding or the like surface preparation normally required. Panel rigidity and bending strength were enhanced by about 30% over standard composition boards.

The present invention provides a number of important advantages. Composition paper flake boards of the invention made from waste paper have physical characteristics which are similar to the specifications of the Food and Agriculture Organization of the United Nations for Plywood and other Wood-based Panels, 1963, which states for medium density particulate board, a density range of 0.40 - 0.80; moisture content range of 5 - 12%; modulus of rupture range of 1500 - 7000 p.s.i.; and modulus of elasticity range of 15,000 - 70,000 p.s.i. The composition paper boards are suitable for use as building materials and furniture components without further surface treatment or preparation and can be readily and inexpensively manufactured by a simple process from waste paper without the need for homogeneity of paper or removal of normally deleterious substances.

What I claim as new and desire to protect by Letters Patent of the United States is:

1. A method of manufacturing a rigid composition paper flake board comprising the steps: fragmenting paper into flakes, adjusting the moisture content of the flakes to not more than 12% by weight of the dry paper, blending the flakes with a thermosetting synthetic resin adhesive selected from the group consisting of urea-formaldehyde and phenol-formaldehyde present in an amount of from about 2% to about 15% by weight of the dry paper, forming said paper flakes into a mat, depositing a blended mixture of wood flour or finely fragmented cellulosic matter and urea-, melamine- or phenol-formaldehyde resin in a ratio of from 1:1 to 4:1 as a layer on surfaces of the said paper flake mat and compressing said mat at a pressure in the range of about 150 to 1000 p.s.i. at a temperature in the range of from about 200 to about 450° F for a time sufficient to cure said resin.

2. A method as claimed in claim 1, said synthetic resin being selected from the group consisting of urea-formaldehyde emulsion containing from about 40 to about 60% by weight resin solids, and phenol formaldehyde emulsion containing from about 40 to about 50% by weight resin solids.

3. A method as claimed in claim 1, blending the flakes with urea-formaldehyde in an amount of from about 6% to about 15% by weight of dry paper.

4. A method as claimed in claim 1, blending the flakes with phenol-formaldehyde in an amount of from about 2% to about 6% by weight of dry paper.

5. In a method as claimed in claim 1, incorporating into the board wax in the amount of from about 0.5 to about 2% based on total dry weight of the board.

6. In a method as claimed in claim 1, adjusting the moisture content of the paper flake mat to between 6 to about 12 % by weight based on dry paper weight.

7. In a method as claimed in claim 1, pre-pressing the loose paper flake mat at ambient temperature at a pressure within the range of from about 150 p.s.i. to about 600 p.s.i.

8. In a method as claimed in claim 1, hot pressing the mat in an extrusion press by extruding resin-coated paper flakes at a pressure in the range of from about 150 p.s.i. to about 600 p.s.i. and a temperature in the range of from about 200° to about 450° F. to produce a board having a density of from about 30 to about 60 pounds per cubic foot.

* * * * *